United States Patent
Fukuoka et al.

[11] Patent Number: 5,573,689
[45] Date of Patent: Nov. 12, 1996

[54] FLUIDIZED BED REACTOR FOR PREPARING METAL NITRIDE

[75] Inventors: Hirofumi Fukuoka; Yoshiharu Konya; Masanori Fukuhira, all of Annaka; Ichiro Ishizaka, Tokyo, all of Japan

[73] Assignee: Shin-Etsu Chemical Co., Ltd., Tokyo, Japan

[21] Appl. No.: 594,156

[22] Filed: Jan. 31, 1996

[30] Foreign Application Priority Data

Feb. 7, 1995 [JP] Japan ................... 7-042509

[51] Int. Cl.⁶ ....................................... F27B 5/14
[52] U.S. Cl. .................. 219/390; 219/651; 219/686; 373/111; 422/142
[58] Field of Search ................. 219/385, 388, 219/389, 390, 391, 399, 403, 405, 383, 629, 630, 651, 686; 373/109–115, 136, 134; 422/142, 146, 199

[56] References Cited

U.S. PATENT DOCUMENTS

| | | | |
|---|---|---|---|
| 4,950,870 | 8/1990 | Mitsuhashi et al. | 219/390 |
| 5,057,668 | 10/1991 | Gisdakis et al. | 219/390 |
| 5,245,158 | 9/1993 | Hashizume et al. | 219/390 |
| 5,374,413 | 12/1994 | Kim et al. | 423/349 |

*Primary Examiner*—Tu Hoang
*Attorney, Agent, or Firm*—McAulay Fisher Nissen Goldberg & Kiel, LLP

[57] ABSTRACT

In a fluidized bed reactor for preparing a metal nitride by feeding metal powder and a non-oxidizing gas containing $N_2$ or $NH_3$ into a reaction tube (1) to form a fluidized bed (2) therein and heating the fluidized bed for nitriding the metal powder, an envelope (11) encloses the reaction tube (1) for preventing the surrounding air from entering the reaction tube. A heater (9) is disposed outside the envelope (11) for heating the fluidized bed (2) to 1,200° C. or higher. The envelope prevents penetration of the surrounding air into the reaction tube and also prevents deterioration of the heater and surrounding components by scattering of metal fines. The reactor ensures safe operation to prepare metal nitride powder of high purity on an industrial scale.

4 Claims, 2 Drawing Sheets

FLUIDIZED BED REACTOR FOR PREPARING METAL NITRIDE

BACKGROUND OF THE INVENTION

1. Field of the Invention

This invention relates to a fluidized bed reactor for preparing a metal nitride of high purity on an industrial scale.

2. Prior Art

Fluidized bed reaction is often utilized for the preparation of nitrides of metals such as silicon, aluminum and boron. A typical reactor used for such reaction is shown in FIG. 2. The reactor includes a reaction tube 1 in which a fluidized bed 2 is formed. To the lower end of the reaction tube 1 is connected a gas inlet tube 5 having a gas inlet port 4 through a diffuser plate 3. To the upper end of the reaction tube 1 is attached a lid plate 7 having a gas outlet port 6 through an O-ring 8. Outside the reaction tube 1 is disposed a heater 9 which surrounds the reaction tube 1. The heater 9 is, in turn, surrounded by a heat insulator 10. The reaction tube 1 is charged with metal powder such as Si, Al, and B powder. A non-oxidizing gas containing $N_2$ or $NH_3$ is introduced into the reaction tube 1 from the gas inlet port 4 through the gas inlet tube 5 and apertures in the diffuser plate 3, to thereby form a fluidized bed 2 with the metal powder. The heater 9 is actuated to heat the fluidized bed 2 to a temperature of at least 1,200° C. for effecting nitriding of the metal powder.

In reactors as shown in FIG. 2 for preparing metal nitrides through fluidized bed reaction, the nitriding temperature is as high as 1,200° C. or more. To avoid reaction between the reaction tube 1 and the metal powder, a metallic tube is not generally used. Commonly used reaction tubes are of ceramic materials such as SiC, $Si_3N_4$, mullite and $Al_2O_3$. Ceramic tubes, however, can be poorly worked or machined as is well known in the art, and it is difficult to accomplish tight seals. The top and bottom ends of a reaction tube are sealed using an O-ring as shown in FIG. 2 or a glass cap. The resultant seals are still unsatisfactory.

As a result of deficient seals, the prior art reactors have the following problems.

(1) The surrounding air diffuses and penetrates into the reaction tube to form an oxide film on a surface of metal particles which becomes a barrier against diffusion of $N_2$ gas, inhibiting effective reaction. Since oxygen will form a solid solution during nitriding, the resulting metal nitride is of low purity. A sintered product of such metal nitride will have low strength.

(2) One common approach for removing oxide film on the surface of starting metal powder is to mix a reaction gas such as $N_2$ or $NH_3$ with hydrogen gas and feed the mixture into the fluidized bed. There is a possibility that explosive hydrogen gas leak out of the reaction tube.

(3) Reaction tubes of ceramics are less resistant to thermal shock. Upon failure of the reaction tubes by thermal shock, the fluidized bed contents at high temperature will flow out of the system.

(4) As fines of metal powder ground in the fluidized bed will scatter out of the system and the vapor of metal powder will diffuse, they deposit on or react with the surface of the heater and thermal insulator, substantially reducing the life thereof.

One solution is proposed in Japanese Patent Application Kokai (JP-A) No. 97110/1986 as a reactor arrangement wherein a reaction tube and a heater are enclosed with an outer enclosure for shutting off the surrounding atmosphere. This reactor arrangement, however, is difficult to continuously operate on an industrial scale. Since the upper end of the reaction tube is open, metal powder fines formed in the fluidized bed will scatter out of the reaction tube and the vapor of metal powder will diffuse. They deposit on the surface of the heater and thermal insulator to adversely affect them, reducing the life thereof.

SUMMARY OF THE INVENTION

Therefore, an object of the present invention is to provide a fluidized bed reactor for preparing a metal nitride through fluidized bed reaction in a reaction tube, which is capable of long term continuous stable operation to prepare metal nitride powder of high purity on an industrial scale by shutting off fluid communication between the tube and the surrounding atmosphere.

The present invention provides a fluidized bed reactor for preparing a metal nitride by mixing metal powder with a non-oxidizing gas containing $N_2$ or $NH_3$ to form a fluidized bed and heating the fluidized bed at a temperature of at least 1,200° C. for nitriding the metal powder. The reactor includes a reaction tube in which the fluidized bed is formed. An envelope surrounds the reaction tube for preventing the surrounding atmosphere from entering the reaction tube. A heat source is disposed outside the envelope for heating the fluidized bed to a temperature of at least 1,200° C.

Preferably, the reaction tube is formed of SiC, $Si_3N_4$, mullite or $Al_2O_3$. The envelope is preferably formed of a heat resistant metal or carbon. A film of heat resistant material may be formed on a surface of a heat resistant metal or carbon envelope by a CVD or CVR technique.

The reactor of the invention is suitable for the preparation of nitrides of silicon (Si), aluminum (Al) and boron (B). By enclosing with an envelope a reaction tube where a fluidized bed is created to effect nitriding reaction and providing a heat source or heater outside the envelope, the invention prevents the surrounding air from diffusing and penetrating into the reaction tube or fluidized bed. Since the reaction is not inhibited at all, a metal nitride of quality can be prepared in a stable manner. Even when $H_2$ or $NH_3$ gas is used as the fluidizing gas, the probability of danger due to hydrogen leakage is reduced. Even when the reaction tube is broken by thermal shocks, it is protected by the envelope which prevents the fluidized bed contents from exiting the reactor, contributing to safety. Since the heater and the reaction tube are separated by the envelope, fines of metal powder formed within the fluidized bed and the vapor of metal powder will deposit on the inner wall of the envelope, but not on the heater and a thermal insulator for protecting the heater. This eliminates deterioration of the heater and thermal insulator by deposits of metal powder fines and vapor. Therefore, the reactor ensures long term, continuous, stable operation.

BRIEF DESCRIPTION OF THE DRAWINGS

These and further features of the present invention will be apparent with reference to the following description and drawings, wherein.

DESCRIPTION OF THE PREFERRED EMBODIMENT

Figure 1:
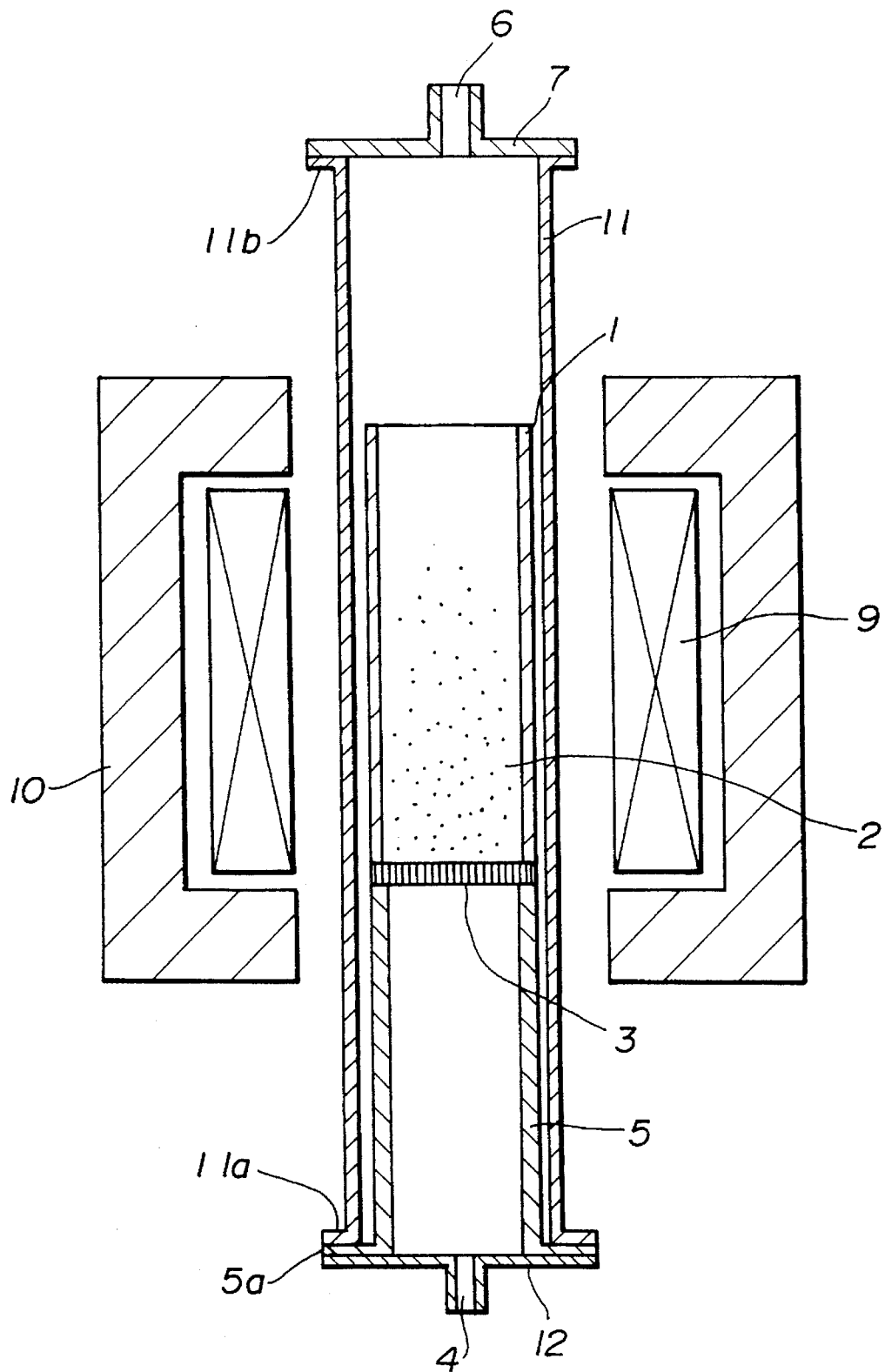
FIG. 1 is a schematic cross-sectional view of a fluidized bed reactor according to one embodiment of the invention.

Referring to FIG. 1, there is illustrated a fluidized bed reactor for preparing metal nitride. The same parts as in FIG.

2 are designated with like numerals and their description is omitted.

Figure 2:
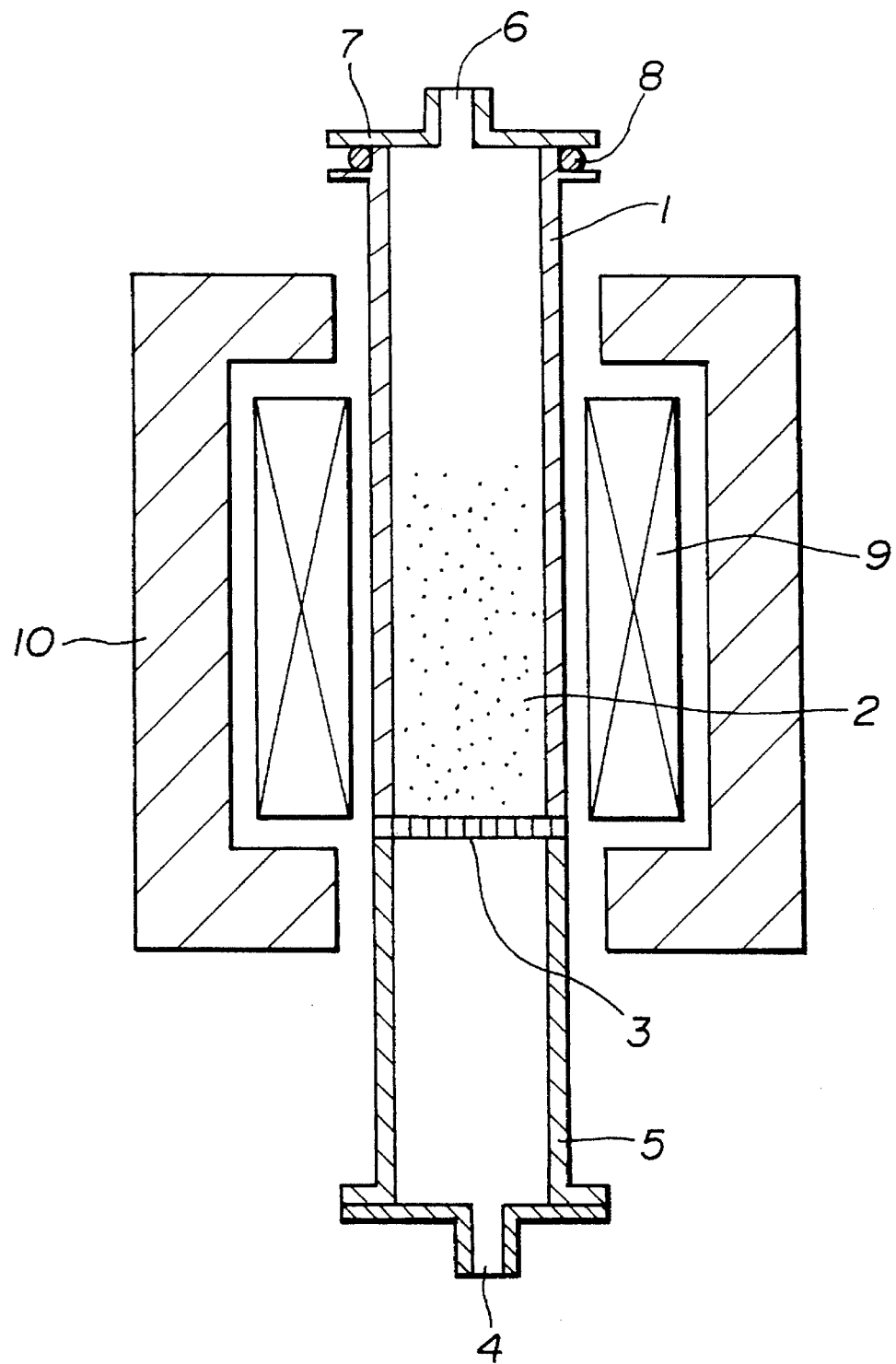
FIG. 2 is a schematic cross-sectional view of a prior art fluidized bed reactor.

As in the prior art reactor of FIG. 2, the reactor of FIG. 1 according to the invention includes a reaction tube 1 in which metal powder is mixed with a non-oxidizing gas containing $N_2$ or $NH_3$ to form a fluidized bed 2 where nitriding reaction takes place at a temperature of at least 1,200° C., preferably 1,200° to 1,500° C., to form a nitride of the metal powder. To the lower end of the reaction tube 1 is connected a gas inlet tube 5. A diffuser plate 3 intervenes between the reaction tube 1 and the inlet tube 5.

An outer envelope 11 is disposed so as to surround the reaction tube 1 and the gas inlet tube 5. In a preferred embodiment where the reaction tube 1 is a hollow cylindrical tube, the envelope 11 is also cylindrical, generally concentric with the reaction tube 1, and axially longer than the reaction tube 1 plus the inlet tube 5. The envelope 11 is provided at a lower end with a lower flange 11a. The gas inlet tube 5 is also provided at a lower end with a lower flange 5a. The envelope flange 11a lies on the inlet tube flange 5a. The opening at the lower end of the gas inlet tube 5 is closed by a lower cover plate 12 having a gas inlet port 4. The envelope 11 is provided at an upper end with an upper flange 11b to which an upper cover plate 7 having a gas outlet port 6 is attached. Though not shown, the gas outlet port 6 is piped to an exhaust gas treatment chamber so that no exhaust gas may exit from the gas outlet port 6 to the surrounding air.

A heat source in the form of a heater 9 is disposed outside the envelope 11. The heater 9 circumferentially surrounds the envelope 11 and axially extends in approximately the same axial range as the reactor tube 1. The heater has an ability to heat the fluidized bed 2 in the reaction tube 1 to a temperature of 1,200° C. or higher. The heater 9 is surrounded by a heat insulator 10.

The reaction tube 1 and the diffuser plate 3 are required to be inert to the metal material to be nitrided and resistant to heat and wear because these components are in direct contact with the fluidized bed contents. Therefore, the reaction tube 1 and the diffuser plate 3 are preferably formed of silicon carbide (SIC), silicon nitride ($Si_3N_4$), mullite or alumina ($Al_2O_3$). The envelope 11 and the gas inlet tube 5 are preferably formed of a material which is gas tight, easy to work a flange structure, and heat resistant. The envelope is preferably formed of a heat resistant metal such as molybdenum (Mo) and tungsten (W) or carbon. A film of heat resistant material such as SiC and $Si_3N_4$ may be formed on a surface of a heat resistant metal or carbon by a chemical vapor deposition (CVD) or chemical vapor reaction (CVR) technique. The heater 9 may be formed of SiC, C, W, Mo, or molybdenum disulfide.

The reactor of FIG. 1 is operated by charging the reaction tube 1 with metal powder and introducing a non-oxidizing gas containing $N_2$ or $NH_3$ into the reaction tube 1 from the gas inlet port 4 through the gas inlet tube 5 and apertures in the diffuser plate 3, to thereby form a fluidized bed 2 with the metal powder. The heater 9 is actuated to heat the fluidized bed 2 to a temperature of 1,200° C. or higher for effecting nitriding of the metal powder. The metal powder used herein is, for example, silicon, aluminum or boron powder and the reactor is suitable for preparing nitrides of these metals. Conditions for nitriding metal powders may be well-known ones.

In the reactor of the invention, the reaction tube 1 is tightly shielded by the envelope 11 from the surrounding air except for the gas outlet port 6. The envelope 11 prevents the surrounding air from diffusing and penetrating into the fluidized bed 2, ensuring that nitriding takes place in the fluidized bed in a stable manner so that metal nitride of high purity is produced. Even when $H_2$ or $NH_3$ gas is used as the fluidizing gas, the outward leakage of hydrogen gas is prohibited. Also the outward leakage of fines of metal powder formed within the fluidized bed and the vapor of metal powder is prohibited. The invention eliminates deposition or reaction of metal powder fines and vapor on the heater 9 and insulator 10, with the heater 9 and insulator 10 remaining free from such deterioration.

The reactor shown in FIG. 1 is a batch reactor. It may be a continuous reactor by connecting a metal powder feed pipe and a metal nitride discharge pipe to the lower and upper ends of the reaction tube 1, respectively, for continuously feeding the metal powder into the reaction tube 1 from below and continuously discharging the metal nitride from the top of the reaction tube. Then the metal nitride can be continuously prepared. In the event where the envelope 11 is made of a material which will deteriorate by oxidation, the overall reactor may be enclosed with an enclosure of suitable material. Then a non-oxidizing gas such as $N_2$ and Ar is admitted outside the envelope for preventing the envelope from oxidation. Other modifications may be made within the scope of the invention.

Experiments are shown below for specifically describing the benefits of the invention.

EXPERIMENT 1 (INVENTION)

Silicon nitride powder was prepared using an inventive fluidized bed reactor as shown in FIG. 1. The reaction tube and diffuser plate were made of $Al_2O_3$. The reaction tube had an inner diameter of 250 mm. The gas inlet tube and envelope were made of carbon on the surface of which a SiC film was deposited by a CVD technique. The envelope had an inner diameter of 300 mm.

The metal raw material used was metallic silicon powder particles having a mean particle size of 4.4 μm which were granulated into granules with a size of 500 μm. The reaction tube was charged with 25 kg of metallic silicon granules. Nitrogen ($N_2$) and hydrogen ($H_2$) gases were introduced into the reaction tube at a flow rate of 130 Nl/min. and 30 Nl/min., respectively, while the reaction tube was heated at a rate of 200° C./hr. to 1,300° C. Nitriding was carried out for 8 hours at 1,300° C.

The resulting silicon nitride powder was a high purity silicon nitride powder having a reactivity of 100%, an alpha-conversion of 93%, and an $O_2$ content of 0.53% by weight. Using a 5-liter wet mill, the silicon nitride powder was milled to a mean particle size of 0.4 to 0.5 μm. To the slurry were added 200 g of hydrofluoric acid and 200 g of nitric acid. This acid treatment was effected at 80° C. for one hour. The treated mixture was washed with water and dried, obtaining a silicon nitride product.

The product was wet milled with yttrium oxide and aluminum oxide in a ratio of 90% by weight $Si_3N_4$, 7% by weight $Y_2O_3$, and 3% by weight $Al_2O_3$, granulated, press molded, and consolidated by cold isostatic pressing (CIP) into a compact under a pressure of 2 t/cm². The compact was fired in a nitrogen atmosphere at 1,780° C. for 4 hours, obtaining a $Si_3N_4$ sintered body. It was measured for bending strength by a room temperature three-point bending test according to JIS R-1601. It was a high strength sintered body having a room temperature sintered strength of 950 MPa.

COMPARATIVE EXPERIMENT

Silicon nitride powder was prepared using a prior art fluidized bed reactor as shown in FIG. 2. The reaction tube and diffuser plate were made of $Al_2O_3$. The reaction tube had an inner diameter of 250 mm. The gas inlet tube was made of carbon on the surface of which a SiC film was deposited by a CVD technique. The reaction tube at the top end was sealed with a water cooled metallic flange and an O-ring made of Viton® (manufactured by du Pont).

Nitriding was carried out using the same procedure and conditions as in Experiment 1. The resulting silicon nitride powder was a low purity silicon nitride powder having a reactivity of 97%, an alpha-conversion of 94%, and an $O_2$ content of 1.25% by weight and rich in unreacted Si and $O_2$. The powder was processed into a sintered body as in Experiment 1. It was a low strength sintered body having a room temperature sintered strength of 780 MPa.

The fluidized bed reactor of the invention ensures safe operation to prepare metal nitride powder of high purity since the envelope prevents diffusion and penetration of the surrounding air into the reaction tube. The envelope also prevents deterioration of the heater and thermal insulator by scattering of metal fines. Stable operation on an industrial scale is possible.

Japanese Patent Application No. 42509/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A fluidized bed reactor for preparing a metal nitride by mixing metal powder with a non-oxidizing gas containing $N_2$ or $NH_3$ to form a fluidized bed and heating the fluidized bed at a temperature of at least 1,200° C. for nitriding the metal powder, said reactor comprising a reaction tube in which the fluidized bed is formed, an envelope enclosing the reaction tube for preventing the surrounding atmosphere from entering the reaction tube, and a means disposed outside the envelope for heating said fluidized bed to a temperature of at least 1,200° C.

2. The fluidized bed reactor of claim 1 wherein the metal powder is silicon, aluminum or boron powder.

3. The fluidized bed reactor of claim 1 wherein said reaction tube is formed of SiC, $Si_3N_4$, mullite or $Al_2O_3$.

4. The fluidized bed reactor of claim 1 wherein said envelope is formed of a heat resistant metal or carbon with or without a film of heat resistant material on a surface thereof.

* * * * *